July 28, 1959 F. SCHMIDT 2,897,277
ZONE PROHIBITING CIRCUIT
Filed Aug. 19, 1953
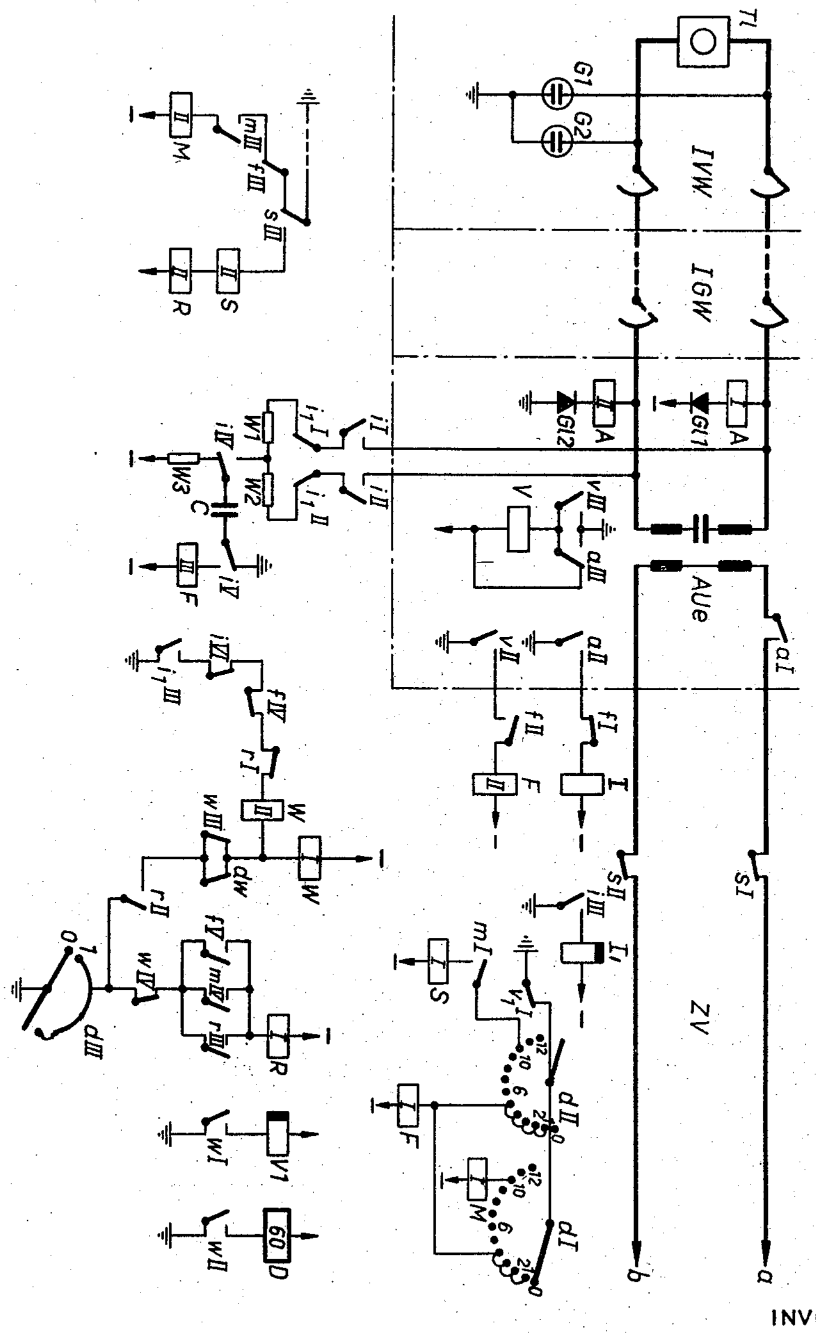
INVENTOR
F. SCHMIDT
BY R.P. Morris
ATTORNEY United States Patent Office 2,897,277

Patented July 28, 1959

2,897,277

ZONE PROHIBITING CIRCUIT

Fritz Schmidt, Stuttgart-Zuffenhausen, Germany, assignor to International Standard Electric Corporation, New York, N.Y., a corporation of Delaware Application August 19, 1953, Serial No. 375,255

Claims priority, application Germany August 23, 1952

4 Claims. (Cl. 179—18)

This invention relates to a circuit arrangement for telephone systems, especially private branch exchange systems, in which certain connections can only be established at authorization of the calling subscriber station.

Such arrangements are used to permit only a limited number of stations in an exchange to establish certain connections such as exchange calls at greater distances, as, for instance, local and toll calls.

Installations known under the term of "zone-prohibiting devices" consist generally of a selector-repeater, which is set by impulses delivered by the station. According to the blocked digits, relays are arranged at the contact bank of the selector-repeater, which in energized state prevent a connection. Stations authorized to make higher valued connections receive a distinguishing mark from the beginning, which is transmitted to the prohibiting device, and which permits the removal of the blocking for certain digits. In this particular case the transmission of this marking is performed by current amplification, which is transmitted by the test wire from the station circuit to the succeeding selector stage. Consequently a repeated translation of this marking between different selector stages is necessary until the zone-prohibiting device is reached, where either the start of the selector-repeater is prevented or the blocking effect is removed.

This translation of the marking of an authorized station requires considerable expenditure of switching devices and additional work, especially, if zone-prohibiting devices have to be installed in existing exchanges. It would necessitate cutting into the circuit wiring of the test wires in the different selector stages.

This invention however provides a very simple solution of this problem, which, without changing the test wire in the different selector stages, permits the marking of stations authorized for certain connections. This is attained in such a way that, in case an authorized station dials a blocked number, an ignition circuit containing glow-discharge lamps is established in which switching devices become effective and remove the blocking effect of the prohibiting device.

According to a further embodiment of this invention, glow-discharge lamps are assigned to the station wires of those stations which are authorized to remove the blocking effect.

A further embodiment provides that two glow-discharge lamps are simultaneously connected to the speaking wires. The common junction point of these lamps is connected to ground potential.

In this manner the marking is transmitted over the speaking wires to the zone-prohibiting device without influencing the test circuits of the selector stages.

The nature of this invention will be more easily understood from the following description of an embodiment represented in the accompanying circuit diagram. In this diagram only those portions of the circuit necessary to understand the invention are disclosed.

Assuming that a subscriber or station user TL has established a connection across the first preselector IVW and the first group selector IGW to the prohibiting device ZV and intends to establish a connection outside its own exchange. In the seized exchange repeater Aue, the relay A has been energized via the looped circuit. Contact $a^{III}$ operates the V-relay which is provided with a time delay and the contact *v*II of which prepares the locking circuit for the F-relay (II) in the zone prohibiting device ZV. As soon as the station user transmits his dial impulses, relay A will follow the impulses and will transfer them to the zone prohibiting device and to the exchange line. Via contact *a*II relay I will be operated in the zone prohibiting device via battery plus, *a*II, *f*I, I, battery minus. Relay I energizes an associating auxiliary relay $I_1$, which is a slow-acting relay, via battery plus, *i*III, $I_1$, battery minus. Upon the transmission of the dial impulses effected by the station user, relay I will act according to the impulses. Relay $I_1$, however, will remain energized continually during the train of impulses owing to its time delay. The contact *i*VI transfers the impulses to relay W in the following circuit: battery plus, $i_1^{III}$, *i*VI, *f*IV, *r*I, W(II), W(I), battery minus. Contact *w*II controls the rotary magnet D60 of the discriminating selector which has three rotary wipers or contacts arms *d*I, *d*II, and *d*III, all operatively connected to the same shaft. The wipers *d*I and *d*II are at such a phase angle in relation to each other than only one wiper will be sweeping over its contacts at a given time; when wiper *d*I leaves contact 12 at the end of its sweep, wiper *d*II will be on contact O, ready to start its sweep. This can be accomplished, for instance, by having the two contact banks side-by-side and subtending an angle of 180°, while the two wipers are at 180° with respect to each other. Wiper *d*III, however, is arranged so that it sweeps over its contacts each time one of the other wipers sweeps over its contacts. This can be accomplished, for instance, by having the contact bank subtend an angle of 180° and having the wiper *d*III in two parts at an angle of 180° with respect to each other.

Contact *w*I energizes relay $V_1$, which is a slow-acting relay, so that during the consecutive connection of the discriminating selector, ground is disconnected from the rotary wipers *d*I and *d*II by means of the contacts $v_1^I$, and so that accordingly no relay can pull up which is connected to a contact which is just swept over by the rotary wiper *d*I. To the contacts of the discriminating selector there are switched, quite according to the requirements, the relays M, F and S, which either serve to release or to block the connection for the dialled numbers.

If the subscriber or station user dials e.g. the number 00, as a separating number for initiating a toll switching operation, i.e. for establishing a long-distance call, then the contact arm *d*I, when the first digit 0 has been dialled, will be set to the tenth contact. In this case, at the end of the pulse train, $V_1$ will release and relay M will be energized via battery plus, $v_1^I$, *d*I, M(I), battery minus and will continue its energization via battery plus, *s*III, *f*III, *m*III, M(II), battery minus. By means of contact *m*IV relay R will be energized via battery plus, rotary wiper *d*III of the discriminating selector, *w*IV, *m*IV, R(I), battery minus and will continue to hold itself via its own contact *r*III. The wiper *d*III, as explained above, operates at the dialling of the first dial number in an in-phase relation to the wiper *d*I, and at the dialling of the second dial number in an in-phase relation to the wiper *d*II. Therefore, with wiper *d*I on contact 10, wiper *d*III will be on its contact 10. With the operation of relay R, contact *r*II completes an energizing circuit for relay W(I) via battery plus, *d*III, *r*II, $\frac{w\text{III}}{dw}$, W(I), battery minus Contact *w*II operates the rotary magnet D60. Contact *d*W opens each time rotary magnet D60 is energized. By opening the contacts *w*III and *dw* the relay W will be de-energized again. Owing thereto the contact *w*III will again complete the circuit for relay W(I), the contact *w*II of which will again energize the rotary magnet. Hence in this way the setting mechanism will be consecutively connected in a self-interrupting circuit until its wiper *d*III reaches the contact 0, thereby disconnecting the ground or plus potential for the circuit of the relay W. The wiper *d*I of the selector-repeater or discriminating selector has completed its full rotation, whereas the wiper *d*II has attained the zero position and will now, when dialling the second digit 0, be controlled to the contact 10. At the end of the digit when $V_1$ releases, relay S will be energized via battery plus, $v_1^{I}$, *d*II, *m*I, S(I), battery minus. On account of this operation relay R will be energized in the following circuit: battery plus, *s*III, S(II), R(II), battery minus.

In this circuit relay S will remain energized. The contacts *s*I and *s*II disconnect the wires from the exchange line. The station user cannot conduct a conversation. The selector-repeater, as described hereinbefore, will be consecutively connected in a self-interrupting circuit and will return to zero position.

In order to provide the privileged subscribers with the possibility of dialling such numbers which are blocked to ordinary subscribers or normally unprivileged station users, glow lamps G1 and G2 are assigned to the lines of the privileged subscribers and are connected to ground. An ignition voltage is likewise simultaneously applied to the speaking wires by the zone-prohibiting device ZV. In order that the usually employed common local battery will suffice, a condenser C will be charged in the non-operating condition: battery plus, *i*V, C, *i*IV, W3, battery minus.

After such a subscriber has seized the exchange repeater AU*e*, relay I will be energized in the zone-prohibiting device, in the manner described already hereinbefore. Contacts *i*IV and *i*V serve to disconnect the condenser from the source of current and to connect it in series with the local battery via a relay F to both the speaking wires which are connected through over the connecting devices: battery plus, $G_1$, *a*-wire (IVW, IGW), *i*I, $i_1^{I}$, $W_1$, *i*IV, C, *i*V, F(III), battery minus and battery plus, $G_2$, *b*-wire (IVW, IGW), *i*II, $i_1^{II}$, $W_2$, *i*IV, C, *i*V, F(III), battery minus.

The charge on condenser C is thus added to the voltage of the battery source and will present sufficient voltage to light the glow lamps, so that relay F can operate. Owing to the fact that the current impulse is limited by contacts of relay $I_1$, which is energized by relay I, the relay F will be held energized in a special circuit: Battery plus, *v*II, *f*II, F(II), battery minus.

Hence the relay F will be energized directly at the beginning of the operation and prevents, by means of contact *f*IV, the selector-repeater from being set and, accordingly, the relays M and S from being energized. The subscriber is now enabled to perform his dialling to the exchange via the closed contacts *s*I and *s*II and is thus able to dial a number which is normally blocked.

I claim:

1. A circuit arrangement for telephone systems, at which certain connections can only be established at authorization of the calling station, comprising a calling station, means for receiving dialled pulse trains from said calling station, an outgoing line, means for normally transferring said pulse trains to said outgoing line, means operated by predetermined ones of said pulse trains for blocking said transferring means to prevent the application of pulses to said outgoing line, switching means for rendering said blocking means inoperative, and means connected in parallel to the speaking wires of said calling station, if said station is authorized to make connections determined by said predetermined pulse trains, for operating said switching means when a call is initiated by said station.

2. A circuit arrangement, as defined in claim 1, in which the means for operating the switching means comprises a pair of glow discharge devices connected respectively between ground and the speaking wires of the calling station.

3. A circuit arrangement, as defined in claim 2, in which the means for operating the switching means further comprises a condenser, means for normally charging said condenser, a relay, a local battery having one terminal connected to ground, and means operated by the initiation of a call from the calling station for connecting said condenser in series with the other terminal of said local battery and said relay to the two speaking wires of said calling station.

4. A circuit arrangement, as defined in claim 3, in which the means for blocking the transferring means comprises a settable selector switch, and means controlled by the transferring means for setting said switch, and in which the switching means comprises a contact of the relay connected to said switch setting means and adapted to render said switch setting means inoperative when said relay is operated.

References Cited in the file of this patent

UNITED STATES PATENTS

| | | |
|---|---|---|
| 1,567,240 | Carpenter | Dec. 29, 1925 |
| 1,804,776 | Hague | May 12, 1931 |
| 1,960,037 | Williams et al. | May 22, 1934 |
| 2,005,595 | Roome et al. | June 18, 1935 |
| 2,294,500 | Hovland | Sept. 1, 1942 |
| 2,519,867 | Wicks | Aug. 22, 1950 |
| 2,524,773 | Deakin | Oct. 10, 1950 |
| 2,544,944 | Wicks | Mar. 13, 1951 |